US012341284B2

(12) United States Patent
Brennan et al.

(10) Patent No.: US 12,341,284 B2
(45) Date of Patent: Jun. 24, 2025

(54) TWO WIRE ELECTRICAL CONNECTOR

(71) Applicant: Sentinel Connector Systems, Inc., York, PA (US)

(72) Inventors: Robert Brennan, York, PA (US); Justin Wagner, York, PA (US); Randy Schwartz, York, PA (US)

(73) Assignee: SENTINEL CONNECTOR Systems, York, PA (US)

( * ) Notice: Subject to any disclaimer, the term of this patent is extended or adjusted under 35 U.S.C. 154(b) by 721 days.

(21) Appl. No.: 17/672,846

(22) Filed: Feb. 16, 2022

(65) Prior Publication Data

US 2022/0271467 A1 Aug. 25, 2022

Related U.S. Application Data

(60) Provisional application No. 63/151,130, filed on Feb. 19, 2021.

(51) Int. Cl.

*H01R 13/42* (2006.01)
*H01R 4/2404* (2018.01)
*H01R 43/20* (2006.01)

(52) U.S. Cl.

CPC .......... *H01R 13/42* (2013.01); *H01R 4/2404* (2013.01); *H01R 43/20* (2013.01)

(58) Field of Classification Search

CPC ................................ H01R 13/42; H01R 43/20

See application file for complete search history.

(56) References Cited

U.S. PATENT DOCUMENTS

| | | | | |
|---|---|---|---|---|
| 4,412,715 | A * | 11/1983 | Bogese, II | H01R 13/6658 439/189 |
| 4,516,822 | A * | 5/1985 | Wolfel | H01R 13/5812 439/459 |
| 5,147,215 | A * | 9/1992 | Pritulsky | H01R 24/62 439/406 |
| 6,017,237 | A * | 1/2000 | Sullivan | H01R 43/01 439/418 |
| 6,354,865 | B1 * | 3/2002 | Bogese | H01R 13/6658 439/418 |
| 7,993,166 | B1 * | 8/2011 | Kline | H01R 27/00 439/676 |
| 8,714,994 | B2 * | 5/2014 | Daily | H01R 24/64 439/344 |
| 10,998,685 | B2 * | 5/2021 | Curtis | H01R 24/64 |
| 11,626,687 | B2 * | 4/2023 | Listing | H01R 13/426 439/382 |
| 11,894,637 | B2 * | 2/2024 | Pepe | H01R 13/5045 |
| 2022/0271467 | A1 * | 8/2022 | Brennan | H01R 43/20 |

* cited by examiner

*Primary Examiner* — Neil Abrams

(74) *Attorney, Agent, or Firm* — KCO Legal

(57) ABSTRACT

A modular plug including a housing including an opening extending from a back end of the plug to an opposing front wall, a plurality of slots in a top surface of the plug that extend into the cavity, where at least two slots include a conductive material.

20 Claims, 3 Drawing Sheets

TWO WIRE ELECTRICAL CONNECTOR

CROSS REFERENCE TO PRIOR APPLICATIONS

This application claims the benefit of U.S. Provisional application filed on Feb. 19, 2021, titled "Two Wire Electrical Connector" the contents of which are hereby incorporated by reference.

BACKGROUND OF THE PRESENT INVENTION

As more and more historically analog devices transition to digital connections, the wiring requirements and power requirements of these devices are designed more for analog devices. However, the infrastructure these devices reside on is gear toward traditional data networks. Modular connectors and patch panels are not suited for connections to historically analog devices.

A need exists for a historically analog device to connect to a modern network.

SUMMARY OF THE PRESENT INVENTION

Systems, methods, features, and advantages of the present invention will be or will become apparent to one with skill in the art upon examination of the following figures and detailed description. It is intended that all such additional systems, methods, features, and advantages be included within this description, be within the scope of the invention, and be protected by the accompanying one embodiment of the present disclosure includes a modular plug including a housing including an opening extending from a back end of the plug to an opposing front wall, a plurality of slots in a top surface of the plug that extend into the cavity, where at least two slots include a conductive material.

Another embodiment includes a guide vane corresponding to each opening.

In another embodiment, the openings are sized to accommodate a twenty-eight gauge wire.

In another embodiment, the openings are sized to accommodate a fourteen gauge wire.

In another embodiment, a plurality of slots are filled with plastic and at least two slots are filled with a copper material.

In another embodiment, the slots filled with copper material are separated by a distance based on the size of the openings.

In another embodiment, the space underneath the slots filled with plastic is filled with plastic to create a barrier between the two openings.

In another embodiment, the openings are sized to accommodate a wire size greater than twenty-eight gauge and less than fourteen gauge.

In another embodiment, the openings extend through the front wall to allow the wires in the openings to extend beyond the front wall.

In another embodiment, an external cutting device cuts the wires extending through the openings.

Another embodiment of the present disclosure includes a method of forming a modular plug including steps of forming a housing including an opening extending from a back end of the plug to an opposing front wall, forming a plurality of slots in a top surface the plug that extend into the cavity, where at least two slots include a conductive material.

Another embodiment includes the step of forming a guide vane corresponding to each opening.

In another embodiment, the openings are sized to accommodate a twenty-eight gauge wire.

In another embodiment, the openings are sized to accommodate a fourteen gauge wire.

In another embodiment, a plurality of slots are filled with plastic and at least two slots are filled with a copper material.

In another embodiment, the slots filled with copper material are separated by a distance based on the size of the openings.

In another embodiment, the space underneath the slots filled with plastic is filled with plastic to create a barrier between the two openings.

In another embodiment, the openings are sized to accommodate a wire size greater than twenty-eight gauge and less than fourteen gauge.

In another embodiment, the openings extend through the front wall to allow the wires in the openings to extend beyond the front wall.

In another embodiment, an external cutting device cuts the wires extending through the openings.

DRAWING SUMMARY

DETAILED DESCRIPTION

Figure 1:
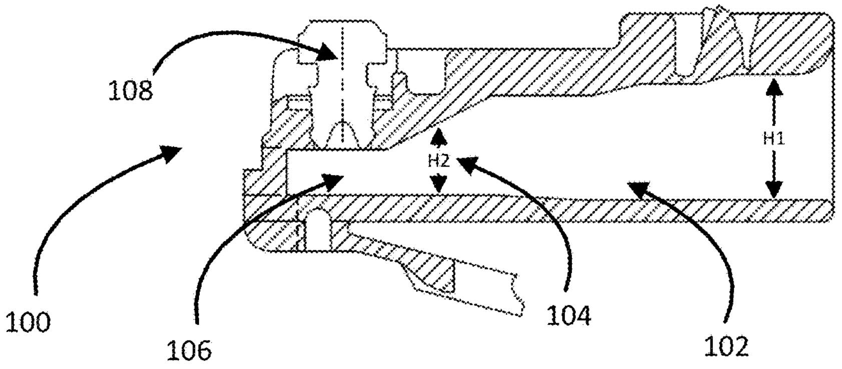
FIG. 1 depicts a cutaway view of a modular connector.
Figure 2:
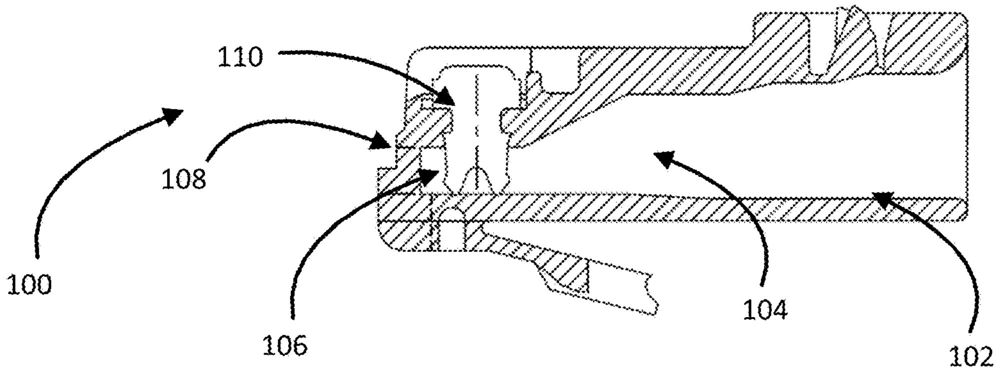
FIG. 2 depicts a rear view of the modular connector housing.

FIG. 1 depicts a cutaway view of a modular connector 100. The modular connector includes a central cavity 102 that is sized to accommodate a cable holding a plurality of individual wires. The cavity 102 has an initial height (H1) and transitions to a second height (H2) in a transition portion 104 of the cavity 102. A front cavity 106 extends from the transition portion to a front wall 108 of the plug. In one embodiment, openings extend through the front wall 108 such that the wires extend out beyond the front wall 108. Contacts 110 are positioned in slots directly above the front cavity 106. FIG. 2 depicts a cut away view of the connector 100 with the contacts 110 extending down into the front cavity 106. When wires are positioned in the front cavity 106, the contacts 110 pierce through the wires underneath the contacts 110 to electrically engage the wire.

Figure 3:
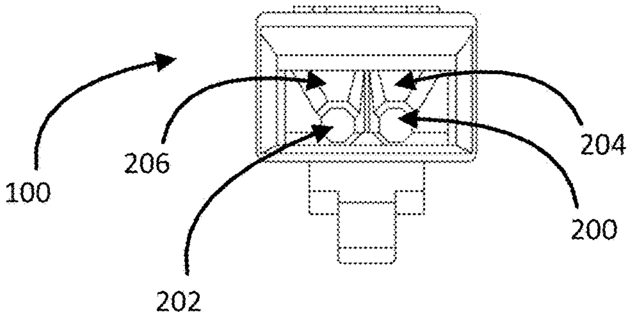
FIG. 3 depicts a rear view of the connector.

FIG. 3 depicts a rear view of the connector 100. The rear view shows the openings 200 and 202 with guiding vanes 206 and 204 being positioned above the openings 200 and 202. The guiding vanes 206 and 204 direct wires into the proper opening 200 and 204 when a cable is inserted into the connector 100. The openings 202 and 204 are sized to accommodate wires between twenty-eight gauge and fourteen gauge. In one embodiment, the openings 200 and 202 extend beyond the front wall 108 of the connector 100 such that the wires extending through the openings 202 and 204 can be cut by an external tool.

Figure 4:
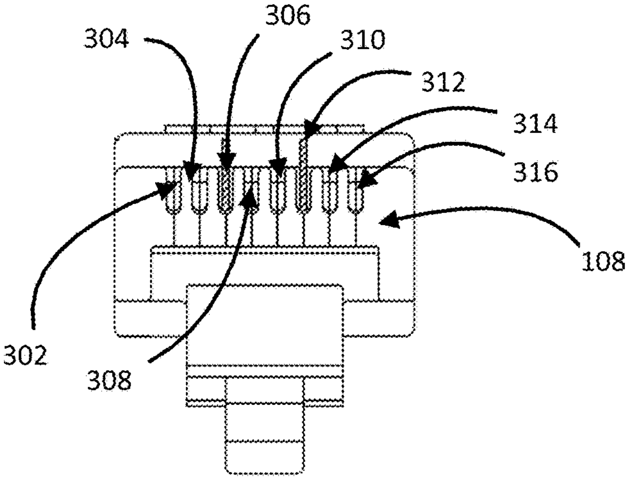
FIG. 4 depicts a front view of the connector.

FIG. 4 depicts a front view of the connector 100. The connector 100 has a plurality of slots 302, 304, 306, 308, 310, 312, 314 and 316 extending from a top surface into the front cavity 106. A select number of slots 302, 304, 306, 308, 310, 312, 314 and 316 are not filled with contacts 110. Only slots 302, 304, 306, 308, 310, 312, 314 and 316 positioned in line an opening 202 and 204 contain contacts, the remaining slots 302, 304, 306, 308, 310, 312, 314 and 316 do not include contacts. In one embodiment, two slots 306 and 312 contain contacts 110.

By adjusting the number of empty slots 302, 304, 308, 310, 314 and 316 between slots 306 and 312 containing contacts 110, the number of openings 202 and 204 in the front wall can be adjusted. Further, the larger the distance between openings, interference caused by adjacent wires can be reduced. For wires transmitting a power signal, increasing the distance can limit the possibility of arcing across conductors.

Figure 5:
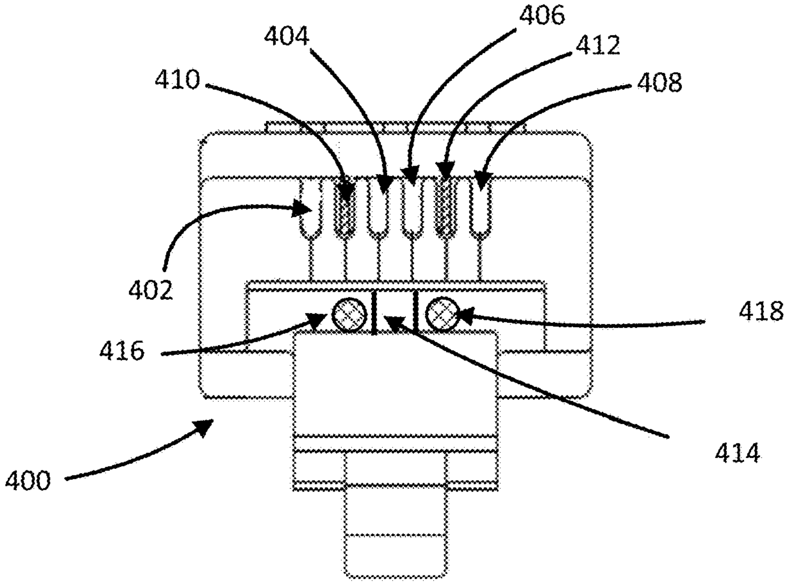
FIG. 5 depicts a front view of a connector.
Figure 6:
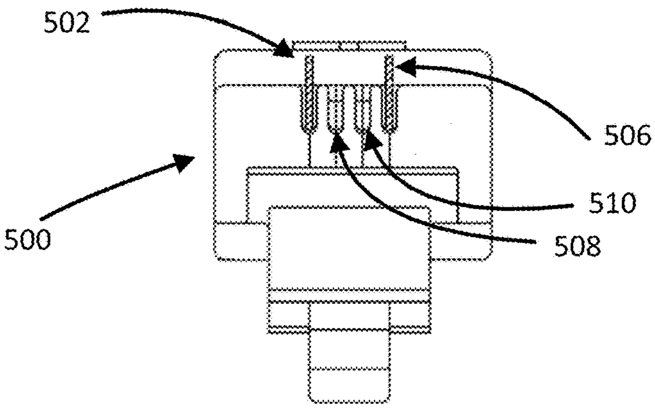
FIG. 6 depicts a front view of connector.

FIG. 5 depicts a front view of connector 400. The connector includes empty slots 402, 404, 406 and 408 and filled slots 410 and 412. The empty slots 404 and 406 create a separation gap 414 between the two conductors 414 and 416. By changing the empty slots between the filled slots, the separation gap 414 can be adjusted to accommodate larger gauge conductors in the connector 400 without changing the overall size of the connector 400. FIG. 6 depicts a front view of a connector 500. The connector 500 includes filled slots 502 and 504 and empty slots 506 and 508.

Figure 7:
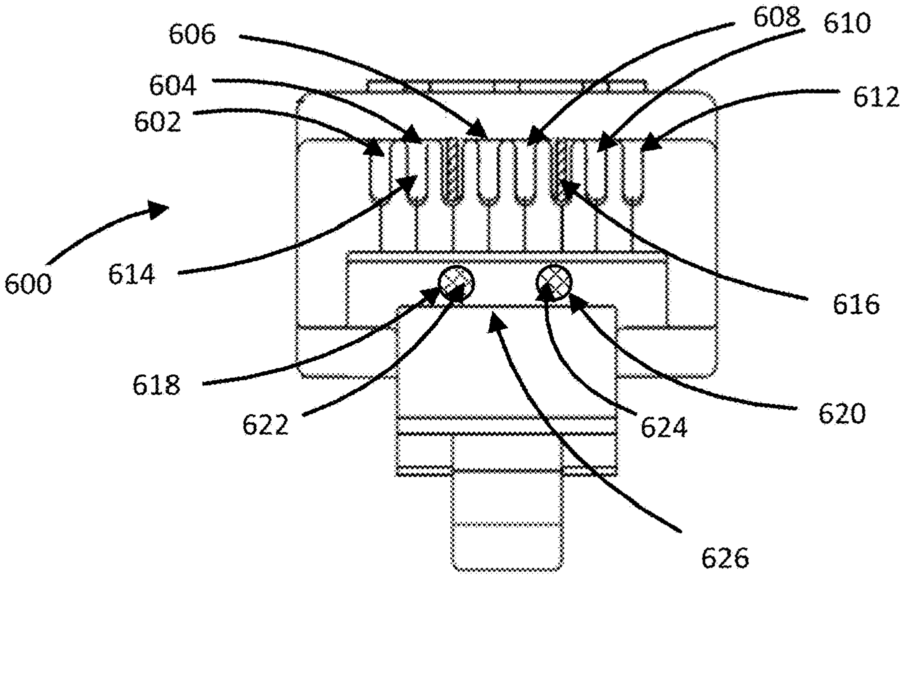
FIG. 7 depicts an embodiment of a plug.

FIG. 7 depicts an embodiment of a plug 600. The plug includes open slots 602, 604, 606, 608, 610 and 612 and two filled slots 614 and 616. The filled slots 614 and 616 are separated by open slots 606 and 608. Two openings 618 and 610 are formed through the front face of the plug. The openings 618 and 620 are sized to accommodate wires 622 and 624 such that each wire 622 and 624 extends through a respective opening 618 and 620 and past the front face of the plug 600. The wires 622 and 624 are positioned such that a blade (not shown) can cut the wires by extending the blade through the wires 622 and 624 until the wire makes contact with cutting surface 626.

In one embodiment, the wires 622 and 624 transmits an analog signal. In another embodiment, the wires 622 and 624 transmits a digital signal. In another embodiment, the wires 622 and 624 transmit power. In another embodiment, the wires 622 and 624 transmits both power and an analog signal. In another embodiment, the wires 622 and 624 transmits both a digital signal and power.

While various embodiments of the present invention have been described, it will be apparent to those of skill in the art that many more embodiments and implementations are possible that are within the scope of this invention. Accordingly, the present invention is not to be restricted except in light of the attached claims and their equivalents.

What is claimed:

1. A modular plug including:

a housing including an cavity extending from a back end of the plug to an opposing front wall;

a first opening and second opening positioned at an end of the cavity;

a plurality of slots in a top surface of the plug that extend into the first opening, second opening and the cavity, wherein at least two non-adjacent slots each positioned over a respective first opening and second opening with each slot including a conductive material and the remaining slots being empty.

2. The modular plug of claim 1 including a guide vane corresponding to each of the first opening and second opening.

3. The modular plug of claim 1, wherein the first opening and second opening are each sized to accommodate a twenty-eight gauge wire.

4. The modular plug of claim 1, wherein the first opening and second opening are each sized to accommodate a fourteen gauge wire.

5. The modular plug of claim 1, wherein a plurality of slots are filled with an electrically insulating material and the at least two non-adjacent slots are filled with a copper material.

6. The modular plug of claim 5, wherein the at least two non-adjacent slots filled with copper material are separated by a distance based on the size of the first opening and second opening.

7. The modular plug of claim 5, wherein the space underneath the slots filled with the electrically insulating material create a barrier between the first opening and second opening.

8. The modular plug of claim 1, wherein the first opening and second opening are each sized to accommodate a wire size greater than twenty-eight gauge and less than fourteen gauge.

9. The modular plug of claim 1, wherein the first opening and second opening each extend through the front wall to allow the wires in the first opening and second opening to extend beyond the front wall.

10. The modular plug of claim 9, wherein the wires extending through the openings are positioned to be cut to a predetermined length.

11. A method of forming a modular plug including steps of:

forming a housing including an opening extending from a back end of the plug to an opposing front wall;

forming a first opening and second opening positioned at an end of the cavity;

forming a plurality of slots in a top surface the plug that extend into the cavity, wherein at least two non-adjacent slots each positioned over a respective first opening and second opening with each slot including a conductive material and the remaining slots being empty.

12. The method of claim 11 including the step of forming a guide vane corresponding to each of the first opening and the second opening.

13. The method of claim 11, wherein the first opening and second opening are each sized to accommodate a twenty-eight gauge wire.

14. The method of claim 11, wherein the first opening and second opening are each sized to accommodate a fourteen gauge wire.

15. The method of claim 11, wherein a plurality of slots are filled with an electrically insulating material and at least two non-adjacent slots are filled with a copper material.

16. The method of claim 15, wherein the non-adjacent slots filled with copper material are separated by a distance based on the size of the first opening and second opening.

17. The method of claim 15, wherein the space underneath the empty slots are filled with the electrically insulating material creates a barrier between the first opening and second opening.

18. The method of claim 11, wherein the first opening and second opening are each sized to accommodate a wire size greater than twenty-eight gauge and less than fourteen gauge.

19. The method of claim 11, wherein the first opening and second opening are each extend through the front wall to allow the wires in the openings to extend beyond the front wall.

20. The method of claim 9, wherein the wires extending through the openings are cur to a predetermined length.

* * * * *